United States Patent [19]

Cates

[11] Patent Number: 4,479,174
[45] Date of Patent: Oct. 23, 1984

[54] EFFICIENCY INCREASING CIRCUIT FOR SWITCHING POWER SUPPLIES OPERATING AT LOW POWER LEVELS

[75] Inventor: Robert P. Cates, Grapevine, Tex.

[73] Assignee: Reliance Electric Company, Cleveland, Ohio

[21] Appl. No.: 438,798

[22] Filed: Nov. 3, 1982

[51] Int. Cl.³ .......................................... H02M 3/335
[52] U.S. Cl. .................................................... 363/21
[58] Field of Search ...................... 363/18, 19, 20, 21, 363/27, 28, 41, 46, 97, 131; 331/112, 146, 149

[56] References Cited

U.S. PATENT DOCUMENTS

| | | | |
|---|---|---|---|
| 3,562,668 | 7/1968 | Bartlett et al. | 331/112 |
| 3,978,393 | 4/1975 | Wisner et al. | 363/19 |
| 4,160,945 | 7/1979 | Schorr | 361/19 |

Primary Examiner—William M. Shoop
Assistant Examiner—Jeffrey Sterrett
Attorney, Agent, or Firm—Michael M. Rickin

[57] ABSTRACT

A circuit for use in a p.w.m. type power supply for increasing the efficiency thereof when the supply operates at low power levels. The circuit increases the efficiency by eliminating in a predetermined manner some of the p.w.m. pulses used to drive the power switching means of the supply.

8 Claims, 6 Drawing Figures

EFFICIENCY INCREASING CIRCUIT FOR SWITCHING POWER SUPPLIES OPERATING AT LOW POWER LEVELS

BACKGROUND OF THE INVENTION

1. Field of the Invention

This invention relates to switching type power supplies and more particularly to a circuit adapted for use therein which increases the efficiency of the supply when it operates at or below some predetermined low power level.

2. Description of the Prior Art

Switching type power supplies are used in the telephone art to provide a variety of voltages to a load. For example, a switching type power supply in the form of a d-c to d-c converter may be used to provide ringing voltage and current (power) to the subscribers of a central office powered multichannel subscriber carrier system. The converter may have to provide a peak load power which is substantially higher than the relatively low load power it normally provides. Ordinarily such converters are designed to have a relatively high efficiency and good stability when they provide such peak power. When such a converter provides the normal and relatively low load power, the efficiency and stability both decrease by substantial amounts.

In the past it has been the practice to design the converter for the desired high efficiency at peak power levels and "live with" the substantially lower and therefore poorer efficiency at the lower power levels. It has, however, been recognized that the circuit of the present invention will increase the efficiency of the converter at such low power levels to be close to the efficiency at the higher or peak power levels.

SUMMARY OF THE INVENTION

In accordance with the present invention there is provided a circuit adapted for use in a switching converter of the type which utilizes pulse width modulations to generate, from a source of high frequency, signals whose width is dependent on the load connected to the supply. The circuit increases the efficiency and stability of the converter when it operates at or below some predetermined low power level.

The circuit has a first means which includes a comparator which is responsive to a signal representative of converter output power level and a signal representative of the predetermined low power level for generating a frequency shift control which has a first amplitude when the output power level is above the reference and a second amplitude when that level is at least equal to if not less than the reference. The circuit also has a second means which responds to the frequency shift control signal and the high frequency signal for generating a signal which has a first and substantially constant waveform when the shift control signal has its first amplitude and a second waveform which is related to the predetermined waveform of the high frequency signal when the shift control signal has its second amplitude.

Finally, the circuit has means to connect the efficiency increasing signal to the pulses in a manner such that the signal has no effect on the pulses when it has a constant waveform and eliminates pulses in a predetermined manner when it has the second waveform. The elimination of the pulses increases the efficiency of the supply at low power levels.

DESCRIPTION OF THE PREFERRED EMBODIMENT

Figure 1:
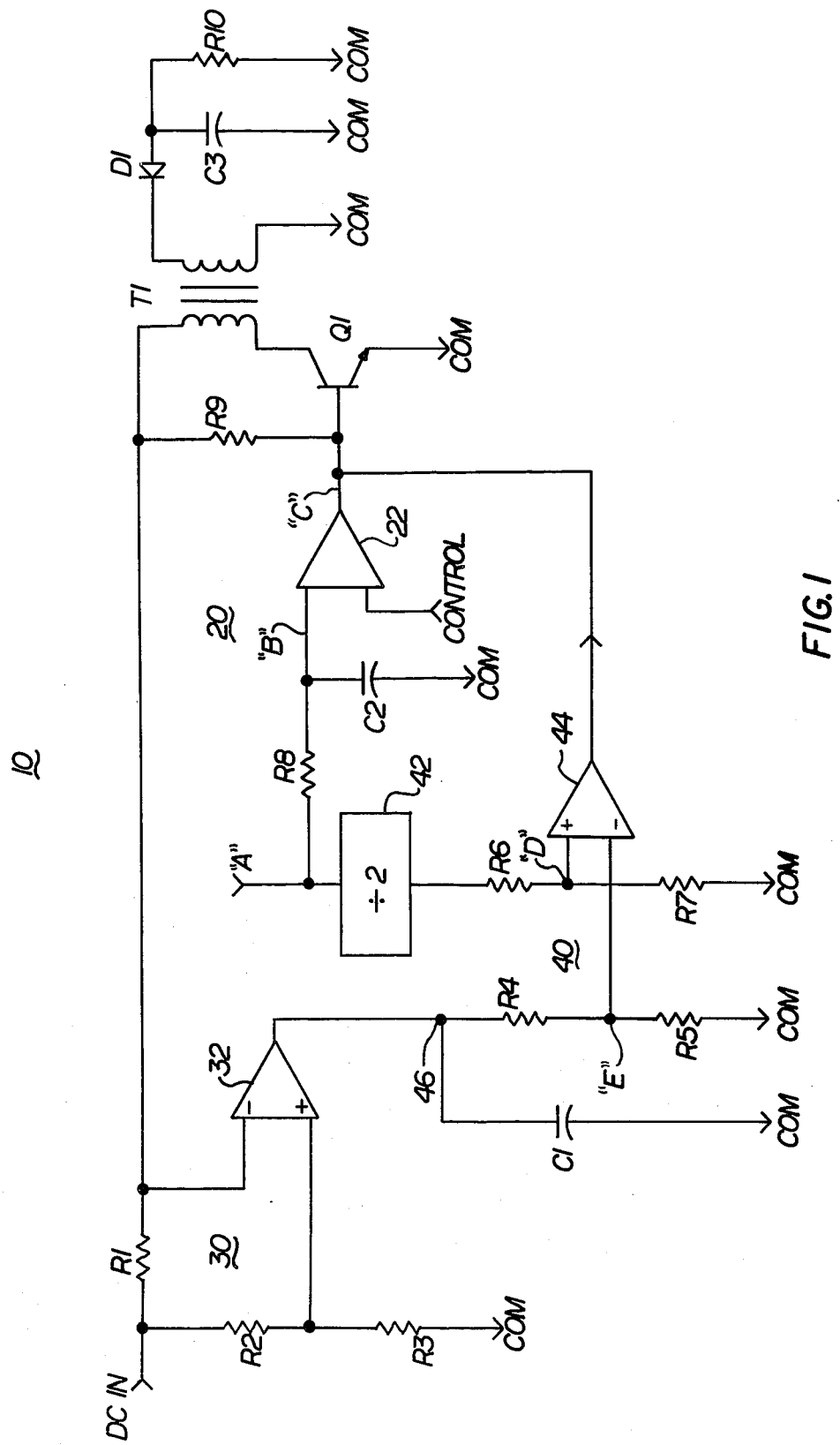
FIG. 1 is a schematic diagram of a typical switching power converter which includes the circuit of the present invention.

Referring to FIG. 1 there is shown a schematic circuit diagram of a d-c to d-c switching power supply 10 in accordance with the present invention. Supply 10 includes conventional switching converter 20 which uses the well-known pulse width modulation (p.w.m.) technique to drive power switching transistor Q1 to thereby provide from a d-c input voltage a regulated d-c output voltage across a load. The load is represented by the resistor R10.

In using the p.w.m. technique conventional converter 20 compares a d-c control voltage at analog comparator 22 to a sawtooth waveform whose frequency is typically 20 Khz or higher to thereby generate the drive signal in the form of pulses to transistor Q1. The sawtooth waveform is derived from a squarewave by the integrating circuit made up of resistor R8 and capacitor C2. The d-c control voltage is derived as a result of a comparison of a signal representative of the output voltage of the converter with a reference signal. For ease of illustration the well-known circuitry used to generate the squarewave and provide the d-c control voltage at one input to comparator 22 has been omitted from FIG. 1.

Figure 2:
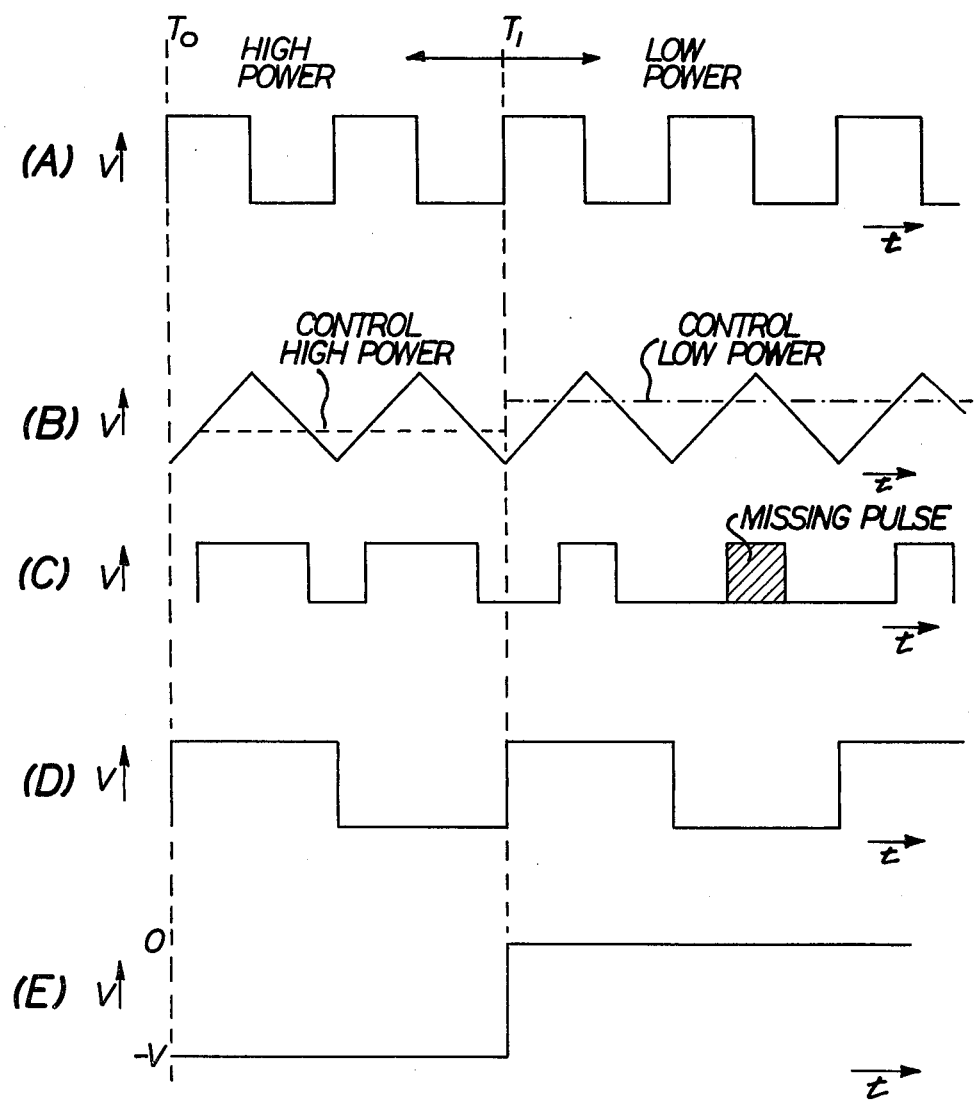
FIGS. 2(A) to (E) are waveforms of the voltages present at various designated locations in the circuit of FIG. 1.

Referring to FIG. 2 there is shown in (A) thereof the high frequency squarewave from which the sawtooth waveform is derived. The sawtooth waveform is shown in (B) thereof. The squarewave appears in switching converter 20 at the junction designated by the letter "A" and after integration appears as the sawtooth waveform at the junction designated by the letter "B". The sawtooth waveform is therefore connected to one input of comparator 22. The d-c control voltage which is applied to the other input of the comparator is also shown in FIG. 2(B). The amplitude of the d-c control voltage is dependent upon the load connected to supply 10 and decreases as supply 10 approaches essentially full load operation. When the amplitude of the sawtooth is above the control voltage, a pulse waveform appears at the output of comparator 22. The comparator output is connected to the junction designated by the letter "C" and the waveform present at the output and therefore the junction is shown in FIG. 2(C). The width of the pulses is dependent upon the load connected to supply 10 and therefore increases to become a larger percentage of the period of the sawtooth waveform as the supply approaches essentially full load operation.

Referring once again to FIG. 1, the pulsed waveform is applied to the base of switching transistor Q1. Each pulse causes the transistor to conduct. As the width of the pulses increases as the supply approaches full load operation, the transistor conducts for a longer period of time for such operation as compared to its time of conduction for loads which are less than full loads. A transformer T1 is used to couple the voltage at the collector of the switching transistor to rectifying diode D1 and capacitor C3 to thereby provide a regulated d-c voltage at load resistor R10. The base of the transistor is connected to circuit common (COM).

Typically, the values for the various circuit components used in conventional converter 20 are selected such that converter 20 has some desired efficiency and stability. Ordinarily, the converter is designed for essentially full load operation. The circuit components are usually selected such that the converter has the desired efficiency and stability when it operates at essentially full load. When the converter begins to operate at some lower power level which is less than the high power level associated with full load operation, its efficiency and stability suffer. At low power levels it is not necessary for switching transistor Q1 to conduct for the same amount of time that it did at the high power levels in order to provide the regulated output voltage and current to the load. Therefore, at such low power levels the width of the drive pulses to transistor Q1 decreases. It is this decrease in pulse width which causes the drop in converter efficiency and stability at such low power levels.

In order that conventional converter 20 may operate with an efficiency and stability at low power levels which is near to that at which it operates at high power levels, switching supply 10 includes input current or power level detector circuit 30 and frequency shifting circuit 40. As will be described in more detail hereinafter, when switching supply 10 operates at low power levels, circuits 30 and 40 function together in a manner so as to eliminate every other drive pulse to transistor Q1. The width of the remaining pulses must therefore increase in order that the transistor conduct for a period of time sufficient to supply the regulated voltage and meet the current requirements of the load. This increased drive pulse width allows switching supply 10 to operate with a more desirable efficiency and stability even at low power levels. Circuits 30 and 40 can be considered as functioning in combination as an efficiency and stability increasing circuit.

The operation of circuits 30 and 40 will now be described in connection with the waveforms shown in FIGS. 2(A) to (E). FIGS. 2(A) to (C) show, as described above, the high frequency squarewave, the sawtooth waveform derived therefrom by the integrator and the drive pulses to transistor Q1. In order that the beneficial effects on the operation of supply 10 of circuits 30 and 40 may be illustrated, it is assumed in FIG. 2 that for the interval of time between T0 and T1 supply 10 operates at a relatively constant high power level. Also for the purposes of illustration, it is assumed that at time T1 converter 20 instantaneously begins to operate at a low power level. That low power level is illustrated by the decreasing portion of the sawtooth which is intersected by the control signal and the attendant decrease in drive pulse width. At this time circuits 30 and 40 begin to operate in the manner described hereinafter.

Circuit 30 includes the series combination of resistors R2 and R3 which is connected between the relatively constant d-c input voltage to the supply and COM. The midpoint of the series combination is connected to the noninverting input of comparator 32. This connection provides a reference voltage to the noninverting input. A resistor R1 is connected in the manner illustrated between the input to supply 10 and the inverting input of comparator 32. The resistor R1 provides a voltage representative of the input current to supply 10 to the inverting input of the comparator. The input current varies with load and decreases as the load decreases. This connection therefore provides to the comparator a signal representative of the power level at which the supply operates. Thus, circuit 30 provides at the output of the comparator a signal which has a negative amplitude at high power levels and an essentially zero amplitude at low power levels. The signal at the output of the comparator is connected to frequency shift circuit 40 and will, therefore, be referred to hereinafter as the frequency shift control signal. While circuit 30 has been shown as including a resistor R1 to provide from the input current a voltage representative of the power level at which the supply operates, it should be appreciated that this voltage may also be obtained by the use of suitably arranged circuitry which senses current at the load.

Circuit 40 includes an input 46 which is connected to the output of comparator 32. A capacitor C1 connects input 46 to COM. The series combination of resistors R4 and R5 also connects input 46 to COM. The midpoint of this series combination, designated by the capital letter "E", is connected to the inverting input of analog comparator 44. The frequency shift control signal is shown in FIG. 2(E) as it appears at midpoint E. The capacitor C1 provides smoothing for the signal at the output of comparator 32. The smoothing ensures that the signal has a relatively fast transition between its two amplitudes. Therefore, the signal at the output of the comparator 32 is essentially a scaled version and unsmoothed version of the signal shown in FIG. 2(E). Thus, the frequency shift control signal appears at the inverting input to comparator 44.

The noninverting input of comparator 44 designated by the capital letter "D" is connected by a resistor R6 to the output of divide-by-2 circuit 42. The input of circuit 42 is connected to the junction A and therefore to the high frequency squarewave shown in FIG. 2(A). Circuit 42 divides the frequency of the squarewave by two such that a squarewave identical to that shown in FIG. 2(A) but at half the frequency shown therein appears at the noninverting input to comparator 44. This squarewave is shown in FIG. 2(D). Circuit 42 may be embodied by a flip-flop. The noninverting input of the comparator is also connected by a resistor R7 to COM.

Circuit 40 operates in the following manner. When the supply 10 is operating at a relatively high power level, the frequency shift control signal has the negative amplitude shown in FIG. 2(E) for the times between T0 and T1. This negative amplitude appears at the inverting input of comparator 44. As the comparator is of the type which has an open collector at its output when its inverting input is held negative, the output of the comparator remains high independent of the squarewave appearing at its noninverting input. The high output of comparator 44 has no effect on the width modulated pulses appearing at junction C.

When supply 10 begins to operate at the predetermined low power level, the amplitude of the frequency shift control signal rises to become essentially zero. The output of comparator 44 is then free to switch between an open collector and a short circuit at the rate determined by the squarewave present at its noninverting input. Each time the squarewave goes low the output of the comparator goes low to thereby hold junction C low. As shown in FIG. 2(C), this going low of junction C causes the pulse which would be generated at the output of comparator 22 during that time interval to be eliminated. Therefore, only half of the pulses that would ordinarily appear at the base of Q1 actually reach the base.

In order that supply 10 meet the low lever power requirements of the load, it is therefore necessary for the supply to increase the width of those pulses which occur when the output of comparator 44 is high. This increase in pulse width, while not shown in FIG. 2, takes place within a few cycles after the first pulse has been eliminated by circuit 40. The increased width compensates for the pulses which are eliminated when the output of the comparator is low. Also, while not shown in FIG. 2, it should be appreciated that the control signal decreases in amplitude to thereby intersect a larger portion of the sawtooth in order that the pulse width may increase. Thus, when supply 10 is meeting the low level power requirements of the load, circuits 30 and 40 function in combination to allow the supply to operate with a desired efficiency and stability even at such low power levels.

The following example may provide further appreciation of the effect that the circuit of the present invention has on increasing the efficiency of a conventional switching converter when that converter operates at lower power levels. In a converter designed to convert 20 V d-c to about 300 V d-c and deliver 14 watts of peak power, the efficiency at that power level was over 80%. When the converter operated at the lower power level of about three (3) watts, the efficiency decreased to about 63%. The circuit of the present invention was then added to the converter. The low power level at which that circuit began to operate and thereby improve converter efficiency was set at three (3) watts. A resistor of 1 ohm resistance was used for R1. With the circuit added the efficiency of the supply increased to about 75% at the three (3) watt level.

While the circuit of the present invention has been described as increasing efficiency by eliminating every other drive pulse at low power levels, it should be appreciated that the circuit may be designed to eliminate pulses in some other predetermined manner. For example, the use of a different circuit for divider 42 may allow for every third drive pulse to be eliminated. In any case, it is the elimination of the drive pulses in a predetermined manner for low power levels and the attendant increase in width of the remaining pulses which increases the efficiency of the converter at such power levels.

It is to be understood that the description of the preferred embodiment is intended to be only illustrative, rather than exhaustive, of the present invention. Those of ordinary skill will be able to make certain additions, deletions, and/or modifications to the embodiment of the disclosed subject matter without departing from the spirit of the invention or its scope, as defined by the appended claims.

What is claimed is:

1. An efficiency increasing circuit adapted for use in a switching power supply of the type which utilizes pulse width modulation to generate, from a source of high frequency signals having predetermined waveform, pulses whose width is dependent on the load connected to said supply to thereby provide from an input voltage power to said load, said efficiency increasing circuit comprising:
    (a) means responsive to the power being provided to said load for generating a frequency shift control signal having a first amplitude when said switching power supply provides a level of load power which is higher than some predetermined level and a second amplitude when said load power level is at least equal to if not lower than said predetermined level;
    (b) means responsive to said high frequency signal and said frequency shift control signal for generating an efficiency increasing signal having a first and substantially constant waveform when said frequency shift control signal has its first amplitude and a second waveform which is related to the predetermined waveform of said high frequency signal when said frequency shift control signal has its second amplitude; and
    (c) means for connecting said efficiency increasing signal to said pulses, said efficiency increasing signal having no effect on said pulses when said frequency shift control signal has said first amplitude and said efficiency increasing signal eliminating pulses in a predetermined manner when said frequency shift control signal has said second amplitude thereby increasing the efficiency of said supply.

2. The efficiency increasing circuit of claim 1 wherein said frequency shift control signal generating means includes first means for generating a signal representative of the power being provided said load and second means for generating a signal representative of said predetermined level.

3. The efficiency increasing circuit of claim 2 wherein said frequency shift control signal generating means further includes comparator means responsive to said load power representative signal and said predetermined level for generating said frequency shift control signal.

4. The efficiency increasing circuit of claim 1 wherein said efficiency increasing signal generating means includes means for generating a signal having a frequency which is related to said high frequency signal and comparator means responsive to said related signal and said frequency shift control signal for generating said efficiency increasing signal.

5. A switching power supply of the type which utilizes pulse width modulation to generate pulses whose width is dependent on the load connected to said supply to thereby provide from an input voltage power to said load, said switching power supply comprising:
    (a) a source of high frequency signals having a predetermined waveform;
    (b) means responsive to said high frequency signals for generating said pulses;
    (c) means responsive to the power being provided to said load for generating a frequency shift control signal having a first amplitude when said switching power supply provides a level of load power which is higher than some predetermined level and a second amplitude when said load power level is at least equal to if not lower than said predetermined level;
    (d) means responsive to said high frequency signal and said frequency shift control signal for generating an efficiency increasing signal having a first and substantially constant waveform when said frequency shift control signal has its first amplitude and a second waveform which is related to the predetermined waveform of said high frequency signal when said frequency shift control signal has its second amplitude; and (e) means for connecting said efficiency increasing signal to said pulses, said efficiency increasing signal having no effect on said pulses when said frequency shift control signal has said first amplitude and said efficiency increasing signal eliminating pulses in a predetermined manner when said frequency shift control signal has said second amplitude thereby increasing the efficiency of said supply.

6. The switching power supply of claim 5 wherein said frequency shift control signal generating means includes first means for generating a signal representative of the power being provided said load and second means for generating a signal representative of said predetermined level.

7. The switching power supply of claim 6 wherein said frequency shift control signal generating means further includes comparator means responsive to said load power representative signal and said predetermined level for generating said frequency shift control signal.

8. The switching power supply of claim 5 wherein said efficiency increasing signal generating means includes means for generating a signal having a frequency which is related to said high frequency signal and comparator means responsive to said related signal and said frequency shift control signal for generating said efficiency increasing signal.

* * * * *